(12) United States Patent
Colville et al.

(10) Patent No.: US 7,594,025 B2
(45) Date of Patent: *Sep. 22, 2009

(54) STARTUP METHODS AND APPARATUSES FOR USE IN STREAMING CONTENT

(75) Inventors: Scott E. Colville, Kirkland, WA (US); Sanjay Bhatt, Redmond, WA (US); Anders E. Klemets, Seattle, WA (US); Troy Batterberry, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 670 days.

This patent is subject to a terminal disclaimer.

(21) Appl. No.: 10/929,191

(22) Filed: Aug. 30, 2004

(65) Prior Publication Data

US 2005/0044166 A1    Feb. 24, 2005

Related U.S. Application Data

(63) Continuation of application No. 09/895,872, filed on Jun. 28, 2001, now Pat. No. 6,792,449.

(51) Int. Cl.
    *G06F 15/16* (2006.01)
(52) U.S. Cl. .................. 709/233; 709/231; 709/232
(58) Field of Classification Search .......... 709/230–234
    See application file for complete search history.

(56) References Cited

U.S. PATENT DOCUMENTS 4,963,995 A    10/1990    Lang (Continued)

FOREIGN PATENT DOCUMENTS

KR    20020069272    8/2002

(Continued)

OTHER PUBLICATIONS

Kawachiya, et al., "Videoproxy: A Media and Protocol Converter for Internet Video", Global Information Infrastructure (GII) Evolution: Interworking Issues, Interworking '96. Third International Symposium on Interworking. Nara (Japan), Oct. 1-3, 1996, Amsterdam, IOS, NL, Oct. 1, 1996 pp. 541-550.

(Continued)

*Primary Examiner*—Nathan J Flynn
*Assistant Examiner*—Jeong S Park
(74) *Attorney, Agent, or Firm*—Merchant & Gould P.C.

(57) ABSTRACT

Methods and apparatuses are provided for use with a client and server device connected through a communication link. The client device sends a startup request to the server device. The startup request identifies a streamable media content that is to be provided to the client device, a communication link bandwidth associated with the communication link, and an amount of the desired streamable media content that is to be provided at a bitrate greater than the encoded bitrate but no greater than about the communication link bandwidth. The server device buffers at least the amount of the streamable media content, and transmits the amount of the buffered streamable media content at the higher bitrate. The server device locates a discrete rendering point in the amount of the buffered streamable media content and initiates transmission beginning with the discrete rendering point. After transmitting the amount of the buffered streamable media content, the server device transmits subsequent portions of the streamable media content to the client device at a bitrate about equal to the encoded bitrate. The client device buffers received streamable media content, and subsequently renders the buffered streamed media content.

24 Claims, 5 Drawing Sheets

U.S. PATENT DOCUMENTS

| | | | |
|---|---|---|---|
| 5,057,932 | A | 10/1991 | Lang |
| 5,132,964 | A | 7/1992 | Esaki |
| 5,164,839 | A | 11/1992 | Lang |
| 5,262,875 | A | 11/1993 | Mincer et al. |
| 5,440,334 | A | 8/1995 | Walters et al. |
| 5,568,181 | A | 10/1996 | Greenwood et al. |
| 5,710,970 | A | 1/1998 | Walters et al. |
| 5,758,076 | A | 5/1998 | Wu et al. |
| 5,787,472 | A | 7/1998 | Dan et al. |
| 5,822,524 | A | 10/1998 | Chen et al. |
| 5,822,537 | A | 10/1998 | Katseff et al. |
| 5,835,495 | A | 11/1998 | Ferriere |
| 5,850,449 | A | 12/1998 | McManis |
| 5,872,920 | A | 2/1999 | Hausman et al. |
| 5,890,010 | A | 3/1999 | Nishigami |
| 5,913,038 | A | 6/1999 | Griffiths |
| 5,931,961 | A | 8/1999 | Ranganathan et al. |
| 5,963,202 | A | 10/1999 | Polish |
| 5,978,567 | A | 11/1999 | Rebane et al. |
| 5,983,263 | A | 11/1999 | Rothrock et al. |
| 5,995,705 | A | 11/1999 | Lang |
| 5,996,015 | A | 11/1999 | Day et al. |
| 6,005,621 | A | 12/1999 | Linzer et al. |
| 6,014,694 | A * | 1/2000 | Aharoni et al. ............. 709/219 |
| 6,014,706 | A | 1/2000 | Cannon et al. |
| 6,041,345 | A | 3/2000 | Levi et al. |
| 6,054,943 | A | 4/2000 | Lawrence |
| 6,111,567 | A | 8/2000 | Savchenko et al. |
| 6,118,817 | A | 9/2000 | Wang |
| 6,120,149 | A | 9/2000 | Hosoi |
| 6,161,201 | A | 12/2000 | Payne et al. |
| 6,195,692 | B1 | 2/2001 | Hsu |
| 6,209,041 | B1 | 3/2001 | Shaw et al. |
| 6,216,163 | B1 | 4/2001 | Bharall et al. |
| 6,262,990 | B1 | 7/2001 | Ejiri |
| 6,272,148 | B1 | 8/2001 | Takagi et al. |
| 6,292,834 | B1 | 9/2001 | Ravi et al. |
| 6,292,880 | B1 | 9/2001 | Mattis et al. |
| 6,314,492 | B1 | 11/2001 | Allen et al. |
| 6,327,421 | B1 | 12/2001 | Tiwari et al. |
| 6,329,165 | B1 | 12/2001 | Chattoraj et al. |
| 6,343,298 | B1 | 1/2002 | Savchenko et al. |
| 6,351,767 | B1 | 2/2002 | Batchelder et al. |
| 6,369,835 | B1 | 4/2002 | Lin |
| 6,385,647 | B1 | 5/2002 | Willis et al. |
| 6,405,256 | B1 | 6/2002 | Lin et al. |
| 6,407,680 | B1 | 6/2002 | Lai et al. |
| 6,421,348 | B1 | 7/2002 | Gaudet et al. |
| 6,449,269 | B1 | 9/2002 | Edholm |
| 6,480,498 | B1 | 11/2002 | Gaudet et al. |
| 6,484,199 | B2 | 11/2002 | Eyal |
| 6,493,748 | B1 | 12/2002 | Nakayama et al. |
| 6,502,135 | B1 | 12/2002 | Munger et al. |
| 6,553,376 | B1 | 4/2003 | Lewis et al. |
| 6,601,009 | B2 * | 7/2003 | Florschuetz ............. 702/124 |
| 6,611,868 | B1 | 8/2003 | Arutyunov |
| 6,611,898 | B1 | 8/2003 | Slattery et al. |
| 6,614,763 | B1 | 9/2003 | Kikuchi et al. |
| 6,643,259 | B1 | 11/2003 | Borella et al. |
| 6,691,312 | B1 * | 2/2004 | Sen et al. .................. 725/96 |
| 6,725,333 | B1 | 4/2004 | Degenaro et al. |
| 6,735,634 | B1 | 5/2004 | Geagan, III et al. |
| 6,757,255 | B1 | 6/2004 | Aoki et al. |
| 6,760,749 | B1 | 7/2004 | Dunlap et al. |
| 6,760,765 | B1 | 7/2004 | Asai et al. |
| 6,765,878 | B1 | 7/2004 | Carlson |
| 6,772,375 | B1 | 8/2004 | Banga |
| 6,779,043 | B1 | 8/2004 | Crinion |
| 6,785,288 | B1 | 8/2004 | Enns et al. |
| 6,792,449 | B2 * | 9/2004 | Colville et al. ............. 709/215 |
| 6,801,947 | B1 * | 10/2004 | Li .......................... 709/231 |
| 6,892,354 | B1 | 5/2005 | Servan-Schreiber et al. |
| 6,952,424 | B1 | 10/2005 | Bass et al. |
| 6,954,430 | B2 | 10/2005 | Haglund |
| 6,986,018 | B2 | 1/2006 | O'Rourke et al. |
| 6,990,512 | B1 * | 1/2006 | Major et al. ............. 709/203 |
| 7,007,090 | B1 | 2/2006 | Spangler et al. |
| 7,020,087 | B2 | 3/2006 | Steinberg et al. |
| 7,051,110 | B2 | 5/2006 | Hagai et al. |
| 7,054,774 | B2 | 5/2006 | Batterberry et al. |
| 7,054,911 | B1 | 5/2006 | Lango et al. |
| 7,054,949 | B2 | 5/2006 | Jennings |
| RE39,184 | E | 7/2006 | Schloss et al. |
| 7,073,028 | B2 | 7/2006 | Lango et al. |
| 7,076,560 | B1 | 7/2006 | Lango et al. |
| 7,133,881 | B2 | 11/2006 | Sirivara et al. |
| 7,185,082 | B1 * | 2/2007 | del Val et al. ............. 709/224 |
| 7,356,605 | B1 * | 4/2008 | Khouri et al. ............. 709/232 |
| 2002/0047899 | A1 | 4/2002 | Son et al. |
| 2002/0048448 | A1 | 4/2002 | Daniels |
| 2002/0049817 | A1 | 4/2002 | Drory et al. |
| 2002/0077900 | A1 | 6/2002 | Thompson et al. |
| 2002/0090027 | A1 | 7/2002 | Karczewicz et al. |
| 2002/0097727 | A1 | 7/2002 | Prakash |
| 2002/0138641 | A1 | 9/2002 | Taylor et al. |
| 2002/0170067 | A1 | 11/2002 | Norstrom et al. |
| 2002/0194608 | A1 | 12/2002 | Goldhor |
| 2003/0018799 | A1 | 1/2003 | Eyal et al. |
| 2003/0055809 | A1 | 3/2003 | Bhat |
| 2003/0099364 | A1 | 5/2003 | Thompson et al. |
| 2003/0236902 | A1 | 12/2003 | Weiss et al. |
| 2003/0236912 | A1 | 12/2003 | Klemets et al. |
| 2004/0003101 | A1 | 1/2004 | Roth et al. |
| 2004/0054912 | A1 | 3/2004 | Adent et al. |
| 2004/0244010 | A1 | 12/2004 | Kleyman et al. |
| 2005/0152400 | A1 | 7/2005 | Suzuki |
| 2005/0157714 | A1 | 7/2005 | Shlissel et al. |
| 2005/0256941 | A1 | 11/2005 | Armstrong et al. |

FOREIGN PATENT DOCUMENTS

| | | |
|---|---|---|
| WO | WO0143445 | 6/2001 |
| WO | WO0230125 | 4/2002 |
| WO | WO0245372 | 6/2002 |

OTHER PUBLICATIONS

Quicktime: "Quicktime Streaming Server Mondules", retrieved from the internet: <ULR:http://netmedia.kjist.ac.kr/courses/dic1698-2002sp/reports/QTSS.pdf> p. 85-87, Quicktime, Feb. 2002, pp. 1-194.

Kamiyama, Noriaki "An Efficient Transmission Protocol for Multicast Video-on-Demand System", Technical Report of IEICE (the Institute of Electronics, Information and Communication Engineers), Japan, The Institute of Electronics, Information and Communication Engineers, Mar. 2001, vol. 100, No. 672, pp. 121-128.

Coulson, "A Distributed Object Platform Infrastructure for Multimedia Applications," Computer Communications, Jul. 1998, 27 pages, vol. 21, No. 9.

Gunningbert et al, "How a large ATM MTU causes deadlocks in TCP data transfers" IEEE/ACM Transactions on Networking vol. 3 Issue 4 Aug. 1995 pp. 409-422.

Nagle, "Congestion Control in IP/TCP Internetworks," RFC 896, Jan. 6, 1984, 8 pages.

Stevens, "TCP Slow Start, Congestion Avoidance, Fast Retransmit, and Fast Recovery Algorithms," RFC, Jan. 1997, 6 pages.

"TCP Protocol Overview," From the Internet: http://www.freesoft.org/CIE/Topics/83.htm, Connected: An Internet Encyclopedia, retrieved on May 31, 2000.

"Transmission Control Protocol," From the Internet: http:/www.scit.wlv.ac.uk/~jphb/comms/tcp.html, retrieved on May 31, 2000.

Kamiyama N et al. "Renegotiated CBR transmission in interactive video-on-demand system", Multimedia Computing and Systems '97 Proceedings, IEEE International Conference, Ottawa ONT Canada Jun. 3-6, 1997 pp. 12-19.

Petit G H et al. "Bandwidth resource optimization in ivdeo-on-demand network architectures", Community Networkign Integrated Multimedia Services to the Home, 1994 Proceedings of the 1st International Workshop on San Francisco CA Jul. 13-14.

Dutta A et al. "A Streaming architecture for next generation internet", ICC 2001, 2001 IEEE International Conference on Communications. Helsinky, Finland, Jun. 11-14, 2001, 1303-1309.

Lixin Gao et al. "Supplying instantaneous video-on-demand services using controlled multicast", Multimedia Computing and Systems, 1999, IEEE International Conference on Florence, Italy Jun. 7-11, 1999, pp. 117-121.

Microsoft Computer Dictionary 5th Edition.

Paknikar, S., et al., "A Caching and Streaming Framework for Multimedia," ACM Multimedia 2000 Los Angeles CA; ACM 2000 1-58113-198-4/00/10; pp. 13-20.

Guo, K., et al.; "RCacher: Design and Analysis of Scalable, Fault Tolerant Multimedia Stream Caching Schemes," Scalability and Traffic Control In IP Networks, Proceedings of SPIE vol. 4526, (2001); 2001 SPIE, 786X/01. pp. 68-86.

Fielding R. et al, "Hypertext Transfer Protocol—HTTP/1.1," Network Working Group Request for Comments: 2616; The Internet Society (Jun. 1999); Category: Standards Track. pp. 1-176.

Schulzrinne, H., et al., "Real Time Streaming Protocol (RTSP)," Network Working Group Request for Comments: 2326; The Internet Society (Apr. 1998). pp. 1-92.

Jin, S., et al. "Accelerating Internet Streaming Media Delivery using Network-Aware Partial Caching," 2002 IEEE, pp. 153-160.

Muuss, M., "The Story of the PING Program," Oct. 18, 1999, retrieved on Apr. 6, 2004 from the Internet Archive at <http://web.archive.org/web/19991018225218/ftp.arl.mit/~mike/ping.hm>, 3 pages.

Muuss, M., "The Research Interests of Mike Muuss," Oct. 8, 1999, retrieved on Apr. 6, 2004 from the Internet Archive at <http://web.archive.org/web/19991008020453/ftp.arl.mil/~mike/>, 2 pages.

Lai, K., et al., "Measuring Bandwidth," INFOCOM '99; Eighteenth Annual Joint Conference of the IEEE Computer and Communications Societies Proceedings; IEEE New York, NY, USA, Mar. 21, 1999, pp. 235-245.

Minshall, G., et al., "Application performance pitfalls and TCP's Nagle algorithm"; vol. 27, No. 4, Mar. 2000, pp. 36-44.

Hayes, D. A., et al., "Impact of Flow Control on quality of service driven packet scheduling disciplines," Proceedings of the 1999 IEEE International Conference on Control Applications, Kohala Coast, HI, Aug. 22, 1999; pp. 1454-1459.

Nishida, Y., et al., "Congestion Control Mechanism for TCP with Packet Pair Scheme," IEICE Transactions on Information and Systems, Institute of Electronics Information and Comm. Egn. Tokyo, JP, vol. E82-D, No. 4, Apr. 1999, pp. 854-862.

Khalil, K. M., et al., "Performance Considerations for TCP/IP in Wide Area Networks," IEEE 1994, pp. 166-175.

Moldeklev, K., et al., "How a Large ATM MTU Causes Deadlocks in TCP Data Transfers," IEEE/ACM Transactions on Networking, vol. 3, No. 4, Aug. 1995, pp. 409-422.

Shannon, C.E., "A Mathematical Theory of Communication," reprinted with corrections from The Bell System Technical Journal, vol. 27, pp. 379-423, 623-656, Jul. Oct. 1948, (pages renumbered as 1-55).

"TAP1 3.0 Connection and Media Services", Microsoft Windows 2000 Server, Copyright 1999, pp. 1-23.

Aboobaker, N., et al., "Streaming Media Congestion Control Using Bandwidth Estimation," Lecture Notes in Computer Science, 2002, vol. 2496, pp. 89-100.

Liefooghe, P., et al., "An Architecture for Seamless Access to Multicast Content," Proceedings of the 26th Annual IEEE Conference on Local Computer Networks, Nov. 8, 2000, pp. 488-494.

Braun, T., et al., "Multicast for Small Conferences," Proceedings of the Sixth IEEE Symposium on Computers and Communications, Jul. 3, 2001, pp. 145-150.

Fleischman, E., "WAVE and AVI Codec Registries," Network Working Group Request for Comments: 2361, The Internet Society, Jun. 1998, pp. 1-71.

Camarillo, G., et al., "Grouping of Media Lines in the Session Description Protocol (SDP)," Network Working Group Request for Comments: 3388, The Internet Society, Dec. 2002, pp. 1-21.

Handley, M., et al., "SDP: Session Description Protocol," Network Working Group Request for Comments: 2327. The Internet Society, Apr. 1998, pp. 1-42.

"Advanced Systems Format (ASF) Specification," Revision 01.20.01e, Microsoft Corp., Sep. 2003, pp. i-vi and 1-93.

Schulzrinne, H., et al., "RTP: A Transport Protocol for Real-Time Applications," Network Working Group RFC: 3550, Jul. 2003, pp. 1-104.

Dey, et al., "Playback Restart in Interactive Streaming Video Applications", IEEE, 1997, pp. 458-465.

* cited by examiner

US 7,594,025 B2

STARTUP METHODS AND APPARATUSES FOR USE IN STREAMING CONTENT

RELATED APPLICATIONS

This application claims priority to U.S. patent application Ser. No. 09/895,872, filed Jun. 28, 2001, titled "Improved Startup Methods And Apparatuses For Use In Streaming Content", and is related to co-pending U.S. patent application Ser. No. 09/636,004, filed Aug. 9, 2000, and titled "Fast Dynamic Measurement of Connection Bandwidth", which is incorporated by reference herein.

TECHNICAL FIELD

The present invention relates generally to streaming media devices, and more particularly to methods and apparatuses that provide improved end-user startup times when streaming content.

BACKGROUND

Today, nearly every computer user is well accustomed to the broadcast television medium. When a new television channel is requested, the new channel is generally displayed (rendered) very quickly. The same can be said for conventional broadcast radio stations.

Unfortunately, the same cannot be said for conventional Internet streamed content. Streaming media is typically provided from a server device to a client device over the Internet or other like network. For a variety of technical reasons, the end-user experience can be degraded, for example, by pauses experienced in the rendering due to late-arriving/resent data. Such pauses, however, tend to occur randomly and in certain configurations occur very rarely. However, there is one pause that most end-users experience every time they select a streaming media program, namely, a slow startup time.

This poor startup experience tends to inhibit the adoption of streaming media in many markets. It is also tends to reduce the amount of time end-users are willing to use the technology. Thus, channel "surfing" is largely unacceptable with conventional streaming techniques. Hence, there is a need for improved streaming media methods and apparatuses that can significantly reduce the startup time that the end-user experiences.

SUMMARY

In accordance with certain aspects of the present invention, improved streaming media methods and apparatuses are provided that significantly reduce the startup time that the end-user experiences.

By way of example, the above stated needs and others are met by a system in accordance with certain implementations of the present invention. The system includes a client device and a server device, which are operatively connected through a communication link. The client device is configured to send at least one startup request to the server device over the communication link. The startup request identifies a streamable media content that is to be provided to the client device, a communication link bandwidth associated with the communication link, and an amount of the desired streamable media content that is to be provided at a bitrate greater than the encoded bitrate, but no greater than about the communication link bandwidth. The server device is configured to buffer at least the amount of the streamable media content and transmit the amount of the buffered streamable media content at the higher bitrate. After transmitting the amount of the buffered streamable media content, the server device transmits subsequent portions of the streamable media content to the client device at a bitrate about equal to the encoded bitrate. The client device is configured to buffer received streamable media content, and subsequently render the buffered streamed media content.

In accordance with certain implementations, the server device locates a discrete rendering point in the amount of the buffered streamable media content and initiates transmission beginning with the discrete rendering point.

In accordance with certain further implementations, the client device determines the communication link bandwidth.

BRIEF DESCRIPTION OF THE DRAWINGS

A more complete understanding of the various methods and apparatuses of the present invention may be had by reference to the following detailed description when taken in conjunction with the accompanying drawings wherein.

DETAILED DESCRIPTION

Figure 1:
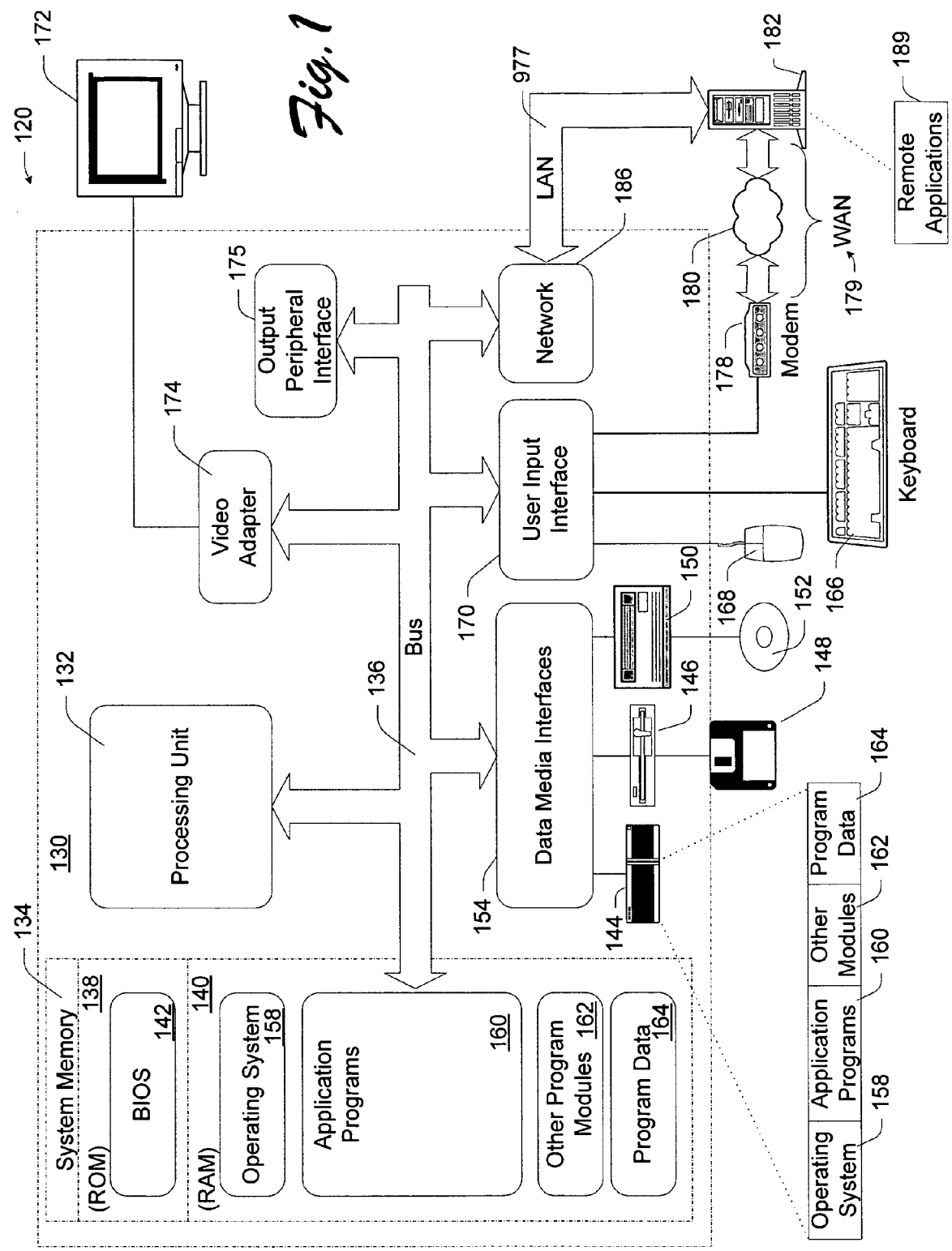
FIG. 1 is a block diagram depicting an exemplary device, in the form of a computer, which is suitable for use in providing, receiving, and/or otherwise communicating streamed media, in accordance with certain implementations of the present invention.

Turning to the drawings, wherein like reference numerals refer to like elements, the invention is illustrated as being implemented in a suitable computing environment. Although not required, portions of the invention are described in the general context of computer-executable instructions, such as program modules, being executed by a computer or like device, which, for example, may take the form of a personal computer (PC), a workstation, a portable computer, a server, a plurality of processors, a mainframe computer, a wireless communications base station, a hand-held communications device, a streamed media player, a set-top box, etc.

Generally, program modules include routines, programs, objects, components, data structures, etc. that perform particular tasks or implement particular abstract data types. The various exemplary implementations of the present invention may also be practiced in distributed computing environments where tasks are performed by remote processing devices that are linked through a communications network. In a distributed computing environment, program modules may be located in both local and remote memory storage devices.

As provided herein, the term "logic" is meant to apply to any form of logic and requisite supporting elements, including, e.g., software, firmware, hardware, and/or any combination thereof.

FIG. 1 illustrates an example of a suitable computing environment 120 on which portions of the subsequently described methods and apparatuses may be implemented.

Exemplary computing environment 120 is only one example of a suitable computing environment and is not intended to suggest any limitation as to the scope of use or functionality of the improved methods and apparatuses described herein. Neither should computing environment 120 be interpreted as having any dependency or requirement relating to any one or combination of components illustrated in computing environment 120.

The improved methods and apparatuses herein are operational with numerous other general purpose and/or special purpose computing system environments or configurations.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and apparatuses described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, Such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Figure 2:
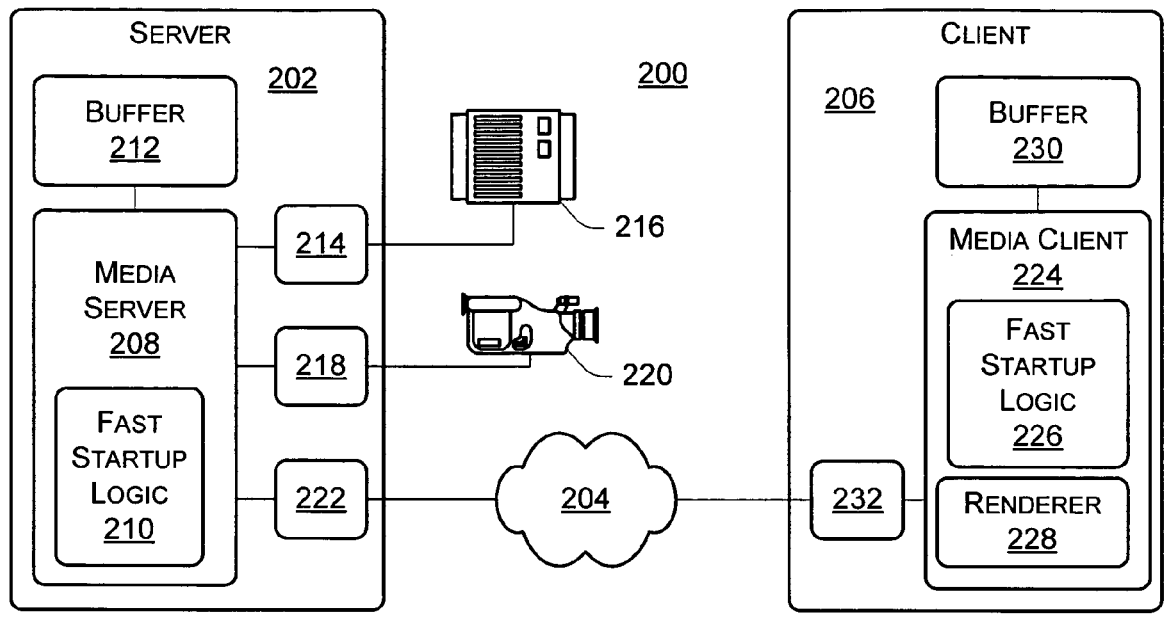
FIG. 2 is a block diagram depicting an exemplary streaming media system having a server device and a client device, in accordance with certain implementations of the present invention.

Reference is now made to FIG. 2, which depicts an exemplary streaming media system 200 having a server device 202 operatively coupled to a network 204 and configured to stream media there over to a client device 206 that is also operatively coupled to network 204.

Streaming media system 200 is arranged in a client-centric configuration in which client device 204 selects a streaming media program on server device 202, specifies that a particular fast startup is desired, and provides information to server device 202 about the communication link over which the streaming media will be carried. In this manner, client device 204 is able to control the streaming media process and server device 202. As described in greater detail below, in controlling the streaming media the client device 204 causes server device 202 to stream media during an initial period of time at data bitrate that is greater than the media's encoded bitrate. This allows client device 204 to quickly receive data and begin the rendering process sooner.

This is unlike previous server-centric solutions used to provide video on-demand, such as, for example, the system and method presented in U.S. Pat. No. 5,963,202, issued to Nathaniel Polish. In such server-centric systems, the server device, rather than the client device, has control over a video data transfer. Thus, for example, a server needs to determine how much video data can be transferred over the communication link and when to transfer it during the progressive download. One of the drawbacks to a server-centric system is that the server is required to monitor, for every client device, the status of the communications link and data buffers in the client device. While a progressive video download technique may be efficient for an in-home or hotel video-on-demand system, it would likely prove inefficient in a larger network environment, such as, for example, the Internet, a corporate intranet, a wide area network, a wireless network, etc.

Returning to FIG. 2, as depicted, server 202 includes a media server 208. Media server 208 includes fast-startup logic 210 and is operatively coupled to a buffer 212. As shown, in this example, media server is operatively coupled to a first interface 214 that provides access to a media storage device 216. Media sever 208 is further operatively coupled to a second interface 218 that provides access to a broadcast media device 220 (represented by a video camera). Media server 208 is operatively coupled to network 204 through a third interface 222. It is recognized that in other implementations interfaces 214, 218 and/or 222 may be combined in some manner.

As its name suggests, media server 208 is configured to serve or otherwise provide streaming media to client device 206. To accomplish this task, media server 208 exchanges information with client device 206 through interface 222 and network 204. The techniques and protocols used to provide communications between server device 202 and client device 206 are well known and therefore will not be described in to great of detail.

Media server 208 identifies the availability of streaming media programs to client device 206. In this example, media server 208 accesses/receives streaming media programs from two sources, namely media storage device 216 and broadcast media device 220. Media storage device 216 is representative of a data storage device, such as, for example, one or more magnetic disk drives, one or more optical disc drives, and the like. Here, media storage device 216 is configured to allow media server 208 to stream media "on-demand" to client device 206. As used herein, "on-demand" means that the media is stored in media storage device 216, and has since then been made available for streaming and replay at subsequent times. Thus, for example, an earlier news program may be recorded and stored in its entirety on media storage device 216 and subsequently made available on-demand.

To the contrary, broadcast media device 220 is representative of media that has not been significantly stored, and certainly not in its entirety. An example would be a news program that is being aired in real-time or near real-time. Such a media program would not, therefore, be available on-demand. When client device 206 selects this broadcast media stream, the streaming media will "jump" into the news program at about the point where it is being aired.

Buffer 212 is used by media server 208 to temporarily store media data in support of the streaming process. Buffer 208 would typically include random access memory.

As shown, client device 206 includes a media client 224. Media client 224 is configured to support the selection, receipt and rendering of streaming media from server device 202 via interface 232 and network 204. To further accomplish its tasks, media client 224 includes fast startup logic 226 and renderer 228. Media client 224 is also operatively coupled to a buffer 230. Buffer 230 typically includes random access memory. Renderer 228 is configured to process the streamed media data and render the data as applicable for client device 206 and the received media. Rendering processes are well known, and the details of such are beyond the scope of the present invention.

With this exemplary streaming media system in mind, this detailed description will now focus on the functionality of media client 224 and fast startup logic 210 in server device 202 and corresponding fast start logic 226 in client device 206.

Media client 224 requires buffering of the streaming data for a variety of reasons. For example, buffering allows client device 206 to request and successfully obtain retransmissions when content packets are lost without impacting continuous playback. Buffering also allows playback to be smooth on networks that have jitter or inconsistent bandwidth response. Highly efficient compression technology often requires a significant duration of content (e.g., an entire frame or more) to be present on the client before decompression can begin. All of these issues contribute to the necessity of buffering content by media client 224.

Depending on the compression technology and the content type, buffering can vary anywhere from less than 1 second to many seconds. Certain conventional media players, for example, buffer roughly five seconds worth of content before allowing any rendering to begin. Because conventional streaming media servers are designed to deliver the content at the encoded bitrate, the end-user will have to wait at least five seconds for the buffers to fill and rendering to begin.

Since broadcast media is typically already running when most client devices connect, a client device may be required to wait before even beginning the buffering process. With typical compression technologies in use today, for example, buffering needs to start at certain discrete points in the stream. When an individual client device subscribes to a conventional broadcast stream, it will need to wait for one of these discrete points to appear in the stream before even starting the buffering process. The frequency of the discrete points can vary dramatically depending on the compression technology used, the content type, and even the content characteristics. These discrete buffering points can vary in frequency from several times a second to as little as once every sixteen seconds or less.

Given that a conventional streaming media client must first wait to find a discrete entry point and then wait for the buffers to fill, the user often experiences significant delay when attempting to start rendering a streaming media broadcast. In accordance with certain aspects of the present invention, methods and apparatuses are provided that tend to significantly reduce the time required to fill the client device's buffer(s) and ultimately allow rendering to begin faster for both broadcast and on-demand content. Thus, for example, in certain exemplary implementations, additional available network bandwidth is utilized to accelerate the streaming of content and as such fill the client device's buffer(s) faster. Hence, the term fast startup.

In accordance with certain aspects of the present invention, the various fast startup methods and apparatuses can be implemented by extending the usage/syntax of conventional streaming protocols, such as, for example, Microsoft Media Server (MMS), Real Time Streaming Protocol (RTSP), HyperText Transfer Protocol (HTTP), and the like.

Co-pending U.S. patent application Ser. No. 09/636,004, filed Aug. 9, 2000, and titled "Fast Dynamic Measurement of Connection Bandwidth", which is incorporated by reference herein, describes, in greater detail, techniques by which media client 224 can determine the bandwidth present between client device 206 and server device 202, prior to requesting the actual delivery of the streaming media. This bandwidth is known as the link bandwidth.

Basically, the fast dynamic measurement of connection bandwidth utilizes a single pair of packets to calculate bandwidth between client device 206 and server device 202. This calculation is based upon a packet-pair technique. This bandwidth measurement is extremely quick. On its journey across network 204, communication equipment and modems may compress a packet. This compression shrinks the size of the packet; thus, it can distort the bandwidth calculation using such a shrunken packet. To avoid this distortion, the fast dynamic measurement of connection bandwidth employs non-compressible packets. More specifically, it employs highly entropic packets. Therefore, a packet cannot be compressed during its journey. In addition, on its journey across network 204, packets may be rerouted, delayed, misrouted, and the like. These momentary delays may result in a momentary bad bandwidth calculation. This problem is ameliorated by using a history list (not shown) at media client 224 that keeps track of recent measurements. Media client 224 can then determine the median value from the history list. That median value is representative of the link bandwidth.

This represents one exemplary technique for determining the link bandwidth. Those skilled in the art will recognize that other techniques may be employed to determine to some degree of certainty the link bandwidth.

Media client 224 can use conventional protocol, such as, e.g., a session description protocol (SDP) to communicate with media server 208 and identify the location and characteristics of the available streaming media.

In this manner, media client 224 is therefore able to determine both the link bandwidth and also the bandwidth of the individual stream(s) in the streaming media program. As such, fast startup logic 226 in media client 224 can request that the content be initially streamed at a rate faster than the encoded bitrate of the content. This request for fast startup is handled by fast startup logic 210 in media server 208.

Assuming normal playback speed, streaming the content at a rate greater than the encoded bitrate implies that the amount of data in client buffer 230 will increase in size over time. It is undesirable to continue to stream the content at a rate faster than the encoded bitrate of the content indefinitely, given the limited amount of memory in buffer 230. Instead, client buffer 230 is sufficiently filled at the fast rate at the beginning of the streaming process, and subsequently the streaming rate changes to roughly match the encoded bitrate of the media program (file). This design has the benefit of using the additional link bandwidth to quickly fill client buffer 230 without requiring additional memory in buffer 230.

Fast startup logic 210, within media server 208, is configured to respond to the fast startup request by streaming the content at the faster rate. In the case of broadcast media, such as a live video feed, fast startup logic 210 temporarily stores a portion of the streaming broadcast media to server buffer 212. In this manner, new client devices connecting to server device 202 can be sent content packets at a rate greater than the encoded bitrate of the broadcast stream.

Thus, for example, in certain implementations if the content is encoded at 16 kbps, then fast startup logic 210 will store the previous 10 seconds of the broadcast media in buffer 212. This exemplary buffering process therefore requires 20 Kbytes of memory. As a result, client devices that connect after the broadcast has started are able to request approximately up to about 10 seconds of content at a rate much faster than 16 kbps.

This is just one example; in other implementations, the buffering process may store a longer or shorter amount of the broadcast media in buffer 212.

Startup logic 210 is further configured to intelligently decide where to start sending content packets from buffer 212 as new clients connect to the broadcast. For example, assume that a broadcast program is running and a new client connects to server 202. If startup logic 210 has buffered the previous 10 seconds of content in buffer 212, then theoretically fast startup logic 210 can start sending content at roughly any point from time ConnectTime$_{clientX}$-10 to ConnectTime$_{clientX}$.

Figure 3:
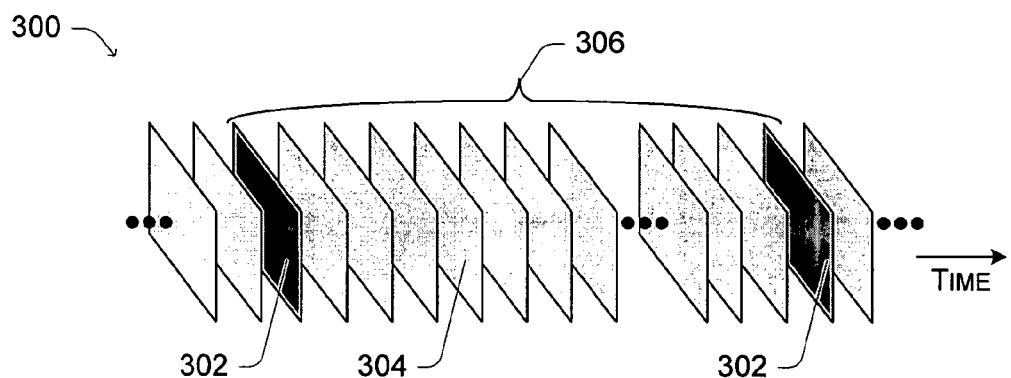
FIG. 3 is an illustrative diagram depicting an exemplary content stream, suitable for streaming in the streaming media system of FIG. 2, in accordance with certain implementations of the present invention.

However, starting the streaming of content at the beginning of the 10 second buffer can be problematic because the content residing at ConnectTime$_{clientX}$-10 may not contain a discrete starting point as required by media client 224. Typically, for certain types of streamed content, media client 224 can only start rendering the content at discrete points within the streamed data, such as, for example, certain frame boundaries or "key frames". By way of example, in MPEG streams, I frames are key frames, P frames are not. See, for further example, FIG. 3, which illustratively depicts a portion 300 of a media stream that includes two key frames 302 and a plurality of other frames 304. As shown, there can be a long rendering time period 306 between key frames 302.

Consequently, startup logic 210 is advantageously configured to selectively scan through the buffered content to locate, and/or otherwise identify/keep track of, a discrete point at which to start the streaming process for a new client device. Preferably, the discrete point will be the earliest one in buffer 212.

Propagation latency is another factor for determining where to start sending content from the buffered list. Since essentially old (i.e., buffered) content is sent to new client devices, and the event may be a live broadcast, a time shift is introduced. The magnitude of the time shift resulting from fast startup logic 210 (and media server 208) is related to the amount of buffering done as well as the starting point chosen for content sent to new client devices.

Clients can randomly connect at any point during a broadcast, and the 10 second buffer list used in this example is constantly changing similar to a "waterfall" or "sliding window". Therefore, the amount of content sent at a rate greater than the encoded bitrate and the starting point for transmission of content will vary over time. Furthermore, since each client device may have a different link bandwidth, the rate of the accelerated transmission may vary too. Each client device may even have different client-side buffer settings. All of these factors imply that client devices will not be synchronized during the rendering process.

If a client device connecting to server 202 does not have considerable additional network bandwidth available, sending the earliest usable point in the content buffer list may unnecessarily increase the propagation latency for that specific client device. Thus, server device 202, and more particularly fast startup logic 210, is configured to "balance" the need for minimizing the startup time with the need for minimizing the propagation time. For example, to help balance the conflicting requirements of minimizing propagation latency and startup latency, logic similar to the following can be employed:

AccelDuration=RequestedAccelDuration−(Accel-Rate* RequestedAccelDuration);

RequestedAccelDuration: The requested duration of the acceleration.

AccelRate: The ratio of the (encoded bitrate of the content)/(link bandwidth).

AccelDuration: The amount of content sent from the server buffers.

The above exemplary logic essentially reduces the amount of "time-shifted" content sent from server buffer 212 as the encoded bitrate of the content approaches the available link bandwidth.

For on-demand content, fast startup logic 210 is configured similar to the broadcast scenario except that there is no existing buffer when client device 206 connects. Therefore, fast startup logic 210 builds a buffer list quickly to satisfy the fast startup request. This is possible because a typical media storage device 216 is capable of delivering the on-demand content at a rate that is much faster than what client device 206 is requesting.

In certain exemplary implementations, the actual protocol mechanism used by client device 206 to request the accelerated buffering involves the use of headers. By way of example, for the RTSP protocol, a header "X-Accelerate-Streaming" is defined, which is used with the PLAY command. This header includes information regarding the client request for the duration of the acceleration and also the bandwidth to use for the acceleration. For example, "AccelDuration=10000;AccelBandwidth=1048576" might be included in a typical "X-Accelerate-Streaming" header by the client. This would inform the server that the client wishes to have 10,000 ms worth of content accelerated at a rate of 1,048,576 bits/s.

With the HTTP protocol, for example, client fast startup logic 226 can use directives in the commonly used PRAGMA header in the GET command to specify the fast startup parameters. The text below shows the contents of a sample PRAGMA header in a GET request asking for fast startup.

"LinkBW=2147483647, AccelBW=1048576, Accel-Duration=10000"

In this exemplary request, the client fast startup logic 226 is informing server fast startup logic 210 that the link bandwidth is 2,147,483,647 bits/s, but it only wants the content accelerated at a rate of 1,048,576 bits/s for a duration of 10,000 ms.

Figure 4:
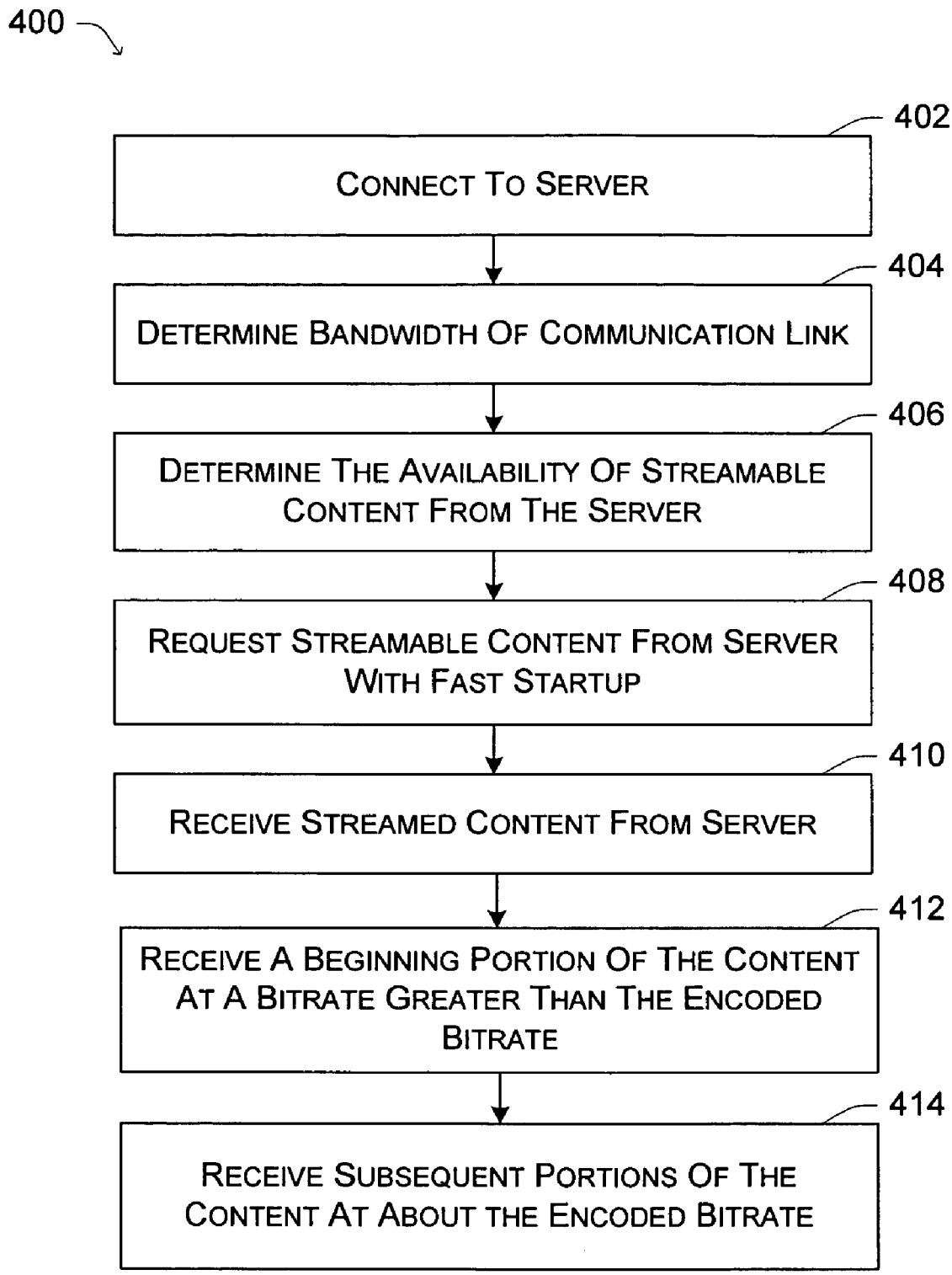
FIG. 4 is a flow diagram depicting an exemplary client-centric media streaming process suitable for use in the client device of FIG. 2, in accordance with certain implementations of the present invention.

Reference is now made to FIG. 4, which is a flow diagram depicting a process 400 suitable for use in client device 206. In step 402, media client 224 connects to media server 208. In step 404, fast startup logic 226 determines the link bandwidth, for example as described above. In step 406, media client 224 asks the media server 210 for information about the available streamable content, including the bandwidth of individual content streams.

In step 410, fast startup logic 226 requests streamable content from fast startup logic 210. In step 410, fast startup logic 226 selects the initial fast streaming bitrate and the subsequent slower streaming bitrate. Fast startup logic 226 also determines an amount of streamed media that is to be sent at the initial fast streaming bitrate.

For example, based on buffer 230 settings, the link bandwidth, and the encoded bitrate of the content, fast startup logic 226 can decide whether to submit a request to accelerate the transmission of content in order to fill buffer 230 quickly. If client device 206 decides to request fast startup, custom header syntax can be added to the final command that initiates the delivery of content from server device 202.

Thereafter, in step 410, media client 224 begins receiving streamed content from media server 208. In step 412, a beginning portion of the content is received at the initial faster streaming bitrate, which is greater than the encoded bitrate. Subsequently, in step 414, further portions of the streamed content are received at the slower streaming bitrate, which is about equal to the encoded bitrate.

Figure 5:
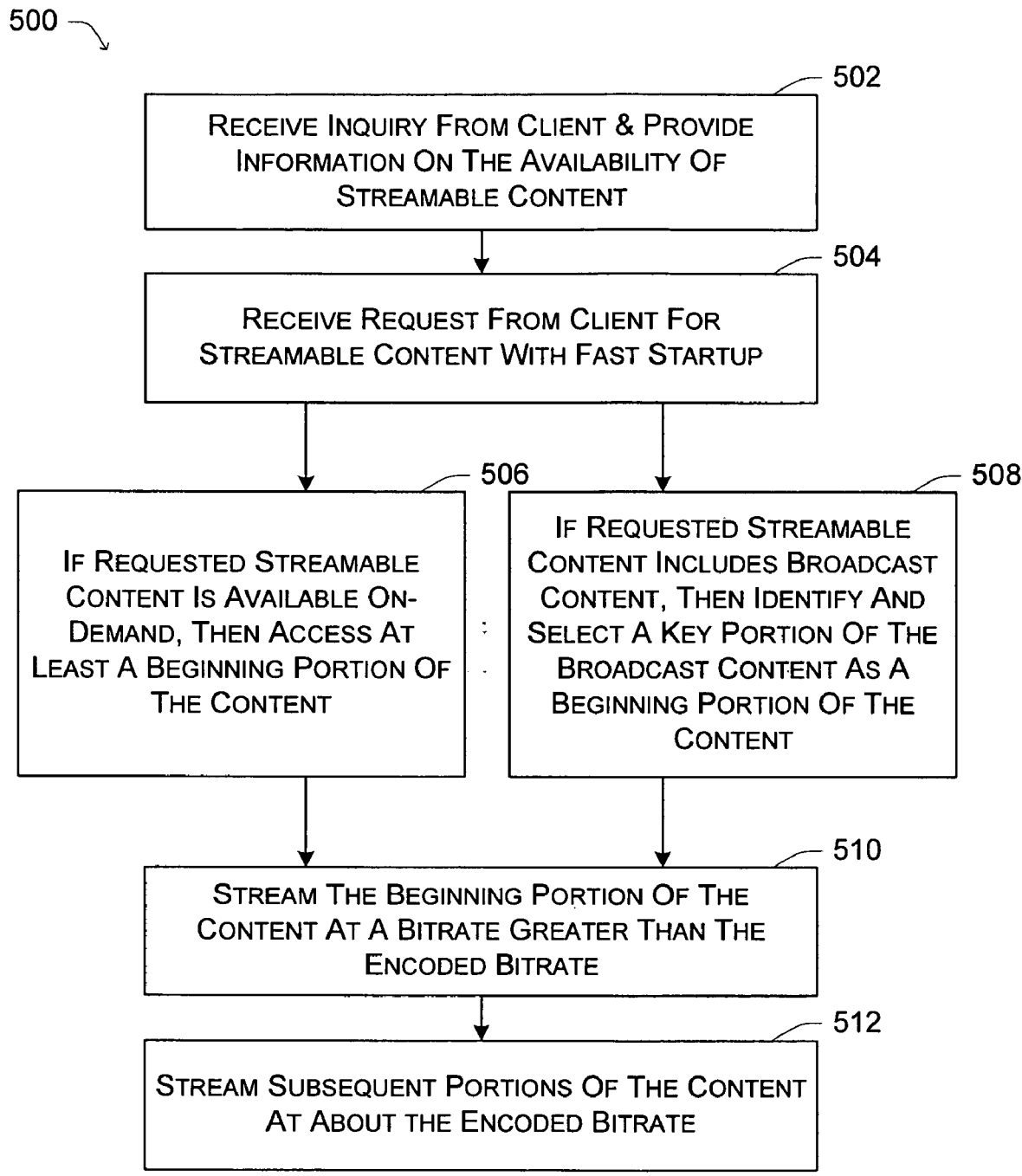
FIG. 5 is a flow diagram depicting an exemplary fast startup media streaming process suitable for use in the server device of FIG. 2, in accordance with certain implementations of the present invention.

Reference is now made to FIG. 5, which is a flow diagram depicting a process 500 suitable for use in server device 202. In step 502, media server 208 processes a client connect request, and responds to client requests for information about the streamable content. In step 504, fast startup logic 210 responds to a received request from client device 206 for streaming media with fast startup. In step 506, if the requested streamable content is on-demand content, then fast startup logic 210 attempts to satisfy the fast startup request by fetching the necessary content from media storage device 216.

Alternatively, if the requested streamable content includes broadcast content, then, in step 508, fast startup logic 210 uses the fast startup parameters received from fast startup logic 226 to determine at what point in the broadcast content the content can begin streaming from buffer 212. When possible, fast startup logic 210 will preferably start the streaming at discrete starting points in the buffer list so that media client 224 can immediately begin buffering useful content packets.

Next, in step 510, fast startup logic 210 initially streams the applicable content at the faster streaming bitrate, and subsequently, in step 512, at the lower streaming bitrate.

Figure 6:
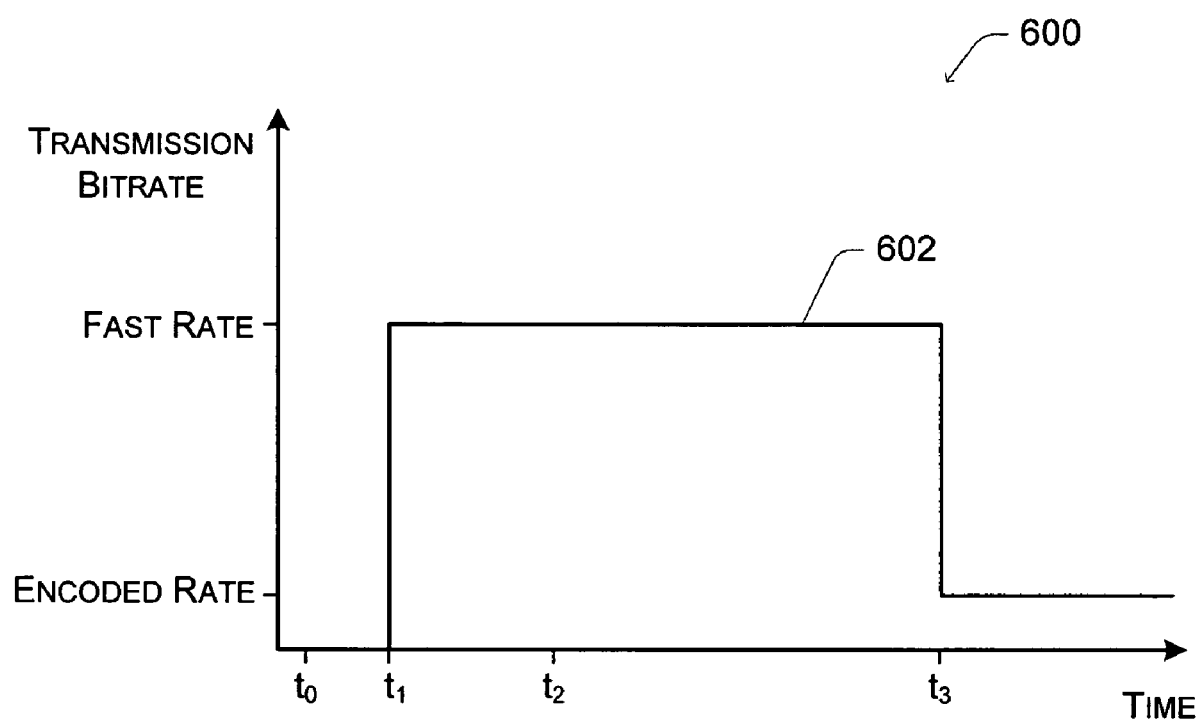
FIG. 6 is a time line diagram depicting the transmission data bitrate for an exemplary fast startup streaming media transmission associated with the streaming media system of FIG. 2, in accordance with certain implementations of the present invention.

Reference is now made to FIG. 6, which is a time line graph 600 illustrating an exemplary transmission bitrate value 602 associated with a requested streaming media program with fast startup. At time $t_0$, client device 206 requests the streaming media program. In response server device 202 begins accessing buffered content. At time $t_1$, server device 202 begins transmitting the content at a fast streaming bitrate. In this example, at about time $t_2$, client device 206 has received and buffered enough streamed media to begin rendering the content. At time $t_3$, server device 202 has delivered the requested amount of fast startup data requested by client device 206. As such, the streaming bitrate is reduced to about the encoded bitrate.

For example, assume that content packets would normally be streamed at a fixed rate of about 56 kbps, even though the link bandwidth for the client device is about 700 kbps. In the fast startup scenario illustrated above, as requested, the content packets that comprise about the first 10 seconds of the media can be streamed at about the link bandwidth rate. Here, this would take roughly 0.8 seconds. Thereafter, the remaining content packets are streamed at the lower encoded bitrate.

In this example, if the round trip time is reasonably short in duration, then media server 208 will begin the fast startup stream about 0.1 seconds after the request is made. Media client 224 will have received about 5 seconds of the streaming media program at about 0.5 seconds following the initial request, and can begin rendering at about that time. The requested 10 seconds of fast startup streamed media will have been received at about 0.9 seconds following the initial request. At that time, renderer 228 will have rendered about 0.4 seconds of content, and about 9.6 seconds of content will be stored in buffer 230.

Thus, in this example, the startup time was reduced from over 5 seconds to less than about 1 second. Furthermore, client device 206 will be able to maintain about 10 seconds of buffered content. This additional buffering allows client device 206 to avoid short pauses due for example to jitter and other potentially longer network brownouts, etc.

Although some preferred implementations of the various methods and apparatuses of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims.

What is claimed is:

1. A method for use in a client device, the method comprising:
    identifying a communication link bandwidth for a communication link between the client device and a server device, wherein identifying the communication link bandwidth comprises:
        sending a plurality of non-compressible packet pairs from the client device to the server device;
        receiving a plurality of non-compressible packet pairs from the server device;
        for each of the plurality of non-compressible packet pairs received from the server device, measuring a packet pair bandwidth;
        tracking each of the measured packet pair bandwidths in a history list; and
        calculating the communication link bandwidth, wherein the communication link bandwidth corresponds to a median value of the measured packet pair bandwidths in the history list;
    requesting from the server device a fast startup transfer of streamable media content having an encoded bit rate, the request identifying the streamable media content, the communication link bandwidth, an initial fast streaming bit rate that is faster than the encoded bit rate but less than about the communication link bandwidth, a subsequent slower streaming bit rate that is about equal to the encoded bit rate, and a first amount of the streamable media content to be streamed at the initial fast streaming bit rate;
    receiving the first amount of the streamable media content streamed at the initial fast streaming bit rate; and
    receiving a second amount of the streamable media content streamed at the subsequent slower streaming bit rate.

2. The method as recited in claim 1, further comprising:
    buffering the received streamable media content; and
    rendering the buffered streamable media content.

3. A method for use in a server device, the method comprising:
    identifying available streaming media content to a client device over a communication link;
    identifying the communication link bandwidth by:
        employing a non-compressible packet pair to calculate a bandwidth measurement between the client device and the server device;
        tracking recent bandwidth measurements in a history list; and
        calculating a median from the history list as the communication link bandwidth,
    receiving a fast startup transfer request to transfer the streaming media content to the client device,
    the request comprising an identification of the streaming media content, the communication link bandwidth, an initial fast streaming bit rate that is faster than the encoded bit rate but less than about the communication link bandwidth, a subsequent slower streaming bit rate that is about equal to the encoded bit rate, and a first amount of the streaming media content to be streamed at the initial fast streaming bit rate.

4. The method as recited in claim 3, further comprising:
    buffering at least the amount of the streaming media content;
    transferring the first amount of the streaming media content at the initial fast streaming bitrate; and
    transferring subsequent amounts of the streaming media content at about the subsequent slower streaming bitrate.

5. The method as recited in claim 4, wherein the transferring the first amount at the initial fast streaming bitrate comprises:
    scanning the buffered amount of the streaming media content; and
    identifying a discrete rendering point within the buffered amount of the streaming media content at which to start the transferring of the first amount.

6. The method as recited in claim 5, wherein the discrete rendering point is an earliest discrete rendering point of a plurality of discrete rendering points within the buffered amount of the streaming media content.

7. The method as recited in claim 5, wherein the identifying a discrete rendering point comprises:
    balancing startup time minimization at the client device with propagation time minimization to the client device.

8. The method as recited in claim 7, wherein the balancing comprises:
    reducing an amount of time-shifted content of the buffered amount of the streaming media content as the encoded bitrate approaches the communication link bandwidth.

9. A client device comprising:
    means for identifying streamable media content available from a server device over a communication link, the streamable media content having associated with it an encoded bitrate;
    means for providing a fast startup request to the server device over said communication link, said fast startup request identifying said streamable media content, a communication link bandwidth determined by tracking non-compressible packets recently sent over the communication link and calculating a median, an initial fast streaming bit rate that is faster than said encoded bit rate but less than about said communication link bandwidth, a subsequent slower streaming bit rate that is about equal to said encoded bit rate, and an amount of said streamable media content to be transmitted at said initial fast streaming bit rate.

10. The client device as recited in claim 9, further comprising:
    means for receiving the amount of said streamable media content from said server device over said communication link;
    means for buffering said received streamable media content, and
    means for subsequently rendering said buffered streamable media content.

11. The client device as recited in claim 10, wherein the means for receiving said amount of said streamable media content from said server device over said communication link further includes:
   means for initially receiving streamable media content associated with a discrete rendering point.

12. The client device as recited in claim 11, wherein the discrete rendering point includes a key frame.

13. The client device as recited in claim 9, wherein said amount of said streamable media content identifies an initial period of playback time.

14. The client device as recited in claim 9, wherein said communication link bandwidth is actively determined by said client device.

15. The client device as recited in claim 9, wherein said streamable media content is selected from a group of streamable media content comprising on-demand media and broadcast media.

16. The client device as recited in claim 9, wherein the means for identifying said streamable media content available from said server device includes means for transmitting at least one session description protocol (SDP) message to said server device.

17. The client device as recited in claim 9, wherein the means for providing said startup request to said server device includes means for transmitting at least one message formatted according to at least one streaming media protocol selected from a group of protocols comprising MMS, Real Time Streaming Protocol (RTSP), and HyperText Transfer Protocol (HTTP).

18. A server device comprising:
   means for identifying streamable media content available to a client device over a communication link, said streamable media content having associated with it an encoded bitrate;
   means for receiving a fast startup request from said client device over said communication link, said startup request specifying said streamable media content to be transmitted to said client, a communication link bandwidth determined by tracking non-compressible packets recently sent over the communication link and calculating a median, an initial fast streaming bit rate that is faster than said encoded bit rate but less than about said communication link bandwidth, a subsequent slower streaming bit rate that is about equal to said encoded bit rate, and an amount of said streamable media content to be transmitted at said initial fast streaming bit rate.

19. The server device as recited in claim 18, further comprising:
   means for buffering at least said amount of said streamable media content; and
   means for transmitting said amount of said buffered streamable media content to said client device at said initial fast streaming bitrate.

20. The server device as recited in claim 19, further comprising:
   after transmitting said amount of said buffered streamable media content, means for transmitting subsequent portions of said streamable media content to said client device at said subsequent slower streaming bitrate.

21. The server device as recited in claim 19, wherein the means for transmitting said amount of said buffered streamable media content to said client device further includes:
   means for locating a discrete rendering point in said amount of said buffered streamable media content; and
   means for initiating transmission of said amount of said buffered streamable media content beginning with said discrete rendering point.

22. The server device as recited in claim 21, wherein said discrete rendering point includes a key frame.

23. The server device as recited in claim 19, wherein said amount of said streamable media content identifies an initial period of playback time.

24. The server device as recited in claim 19, wherein said streamable media content is selected from a group of streamable media content comprising on-demand media and broadcast media.

\* \* \* \* \*

UNITED STATES PATENT AND TRADEMARK OFFICE
CERTIFICATE OF CORRECTION

PATENT NO. : 7,594,025 B2 Page 1 of 1
APPLICATION NO. : 10/929191
DATED : September 22, 2009
INVENTOR(S) : Colville et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1320 days.

Signed and Sealed this

Fourteenth Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,594,025 B2 | Page 1 of 1 |
| APPLICATION NO. | : 10/929191 | |
| DATED | : September 22, 2009 | |
| INVENTOR(S) | : Scott E. Colville et al. | |

It is certified that error appears in the above-identified patent and that said Letters Patent is hereby corrected as shown below:

Title page, item (75), under "Inventors" column 1, line 3 delete "Seattle," and insert -- Redmond, --, therefor.

Signed and Sealed this

Fifteenth Day of February, 2011

David J. Kappos
*Director of the United States Patent and Trademark Office*